(12) United States Patent
Konno

(10) Patent No.: US 11,673,131 B2
(45) Date of Patent: Jun. 13, 2023

(54) HONEYCOMB STRUCTURE

(71) Applicant: NGK INSULATORS, LTD., Nagoya (JP)

(72) Inventor: Yoshiki Konno, Tajimi (JP)

(73) Assignee: NGK INSULATORS, LTD., Nagoya (JP)

( * ) Notice: Subject to any disclaimer, the term of this patent is extended or adjusted under 35 U.S.C. 154(b) by 154 days.

(21) Appl. No.: 17/169,838

(22) Filed: Feb. 8, 2021

(65) Prior Publication Data

US 2021/0260570 A1    Aug. 26, 2021

Related U.S. Application Data

(63) Continuation of application No. PCT/JP2020/034764, filed on Sep. 14, 2020.

(30) Foreign Application Priority Data

Feb. 20, 2020   (JP) .............................. JP2020-027419

(51) Int. Cl.
*B01J 35/04* (2006.01)
*C04B 38/00* (2006.01)
*B01D 53/88* (2006.01)

(52) U.S. Cl.
CPC ............ *B01J 35/04* (2013.01); *B01D 53/885* (2013.01); *C04B 38/0009* (2013.01); *B01D 2255/92* (2013.01)

(58) Field of Classification Search
CPC ...................................................... B01J 35/04
See application file for complete search history.

(56) References Cited

U.S. PATENT DOCUMENTS

2003/0138596 A1    7/2003   Harada et al.
2004/0045267 A1    3/2004   Ichikawa et al.
(Continued)

FOREIGN PATENT DOCUMENTS

DE    10 2020 206 866 A1    12/2020
DE    11 2018 007 411 T5    12/2020
(Continued)

OTHER PUBLICATIONS

German Office Action (Application No. 11 2020 000 119.9) dated Mar. 10, 2022 (with English translation).

*Primary Examiner* — Mark Ruthkosky
*Assistant Examiner* — Julia L Rummel
(74) *Attorney, Agent, or Firm* — Burr Patent Law, PLLC

(57) ABSTRACT

A honeycomb structure, including: a plurality of pillar shaped honeycomb segments, each of the pillar shaped honeycomb segments including a partition wall and a plugged portion; and a joining layer arranged so as to join side surfaces of the pillar shaped honeycomb segments to each other. The honeycomb structure satisfies the following equations (1) to (3):

$$y \leq 1000 \tag{1};$$

$$y \leq 717.92 x^{-0.095} \tag{2; and}$$

$$y \geq 462.4 x^{-0.153} \tag{3},$$

in which y is a maximum temperature (° C.) at which the use of the honeycomb structure is accepted, and x is a thermal conduction factor represented by the following equation:

thermal conduction factor=(thermal conductivity of the partition wall×thermal conductivity of the joining layer)/(average thickness of the joining layer×porosity of the partition wall).

9 Claims, 5 Drawing Sheets

(56) References Cited

U.S. PATENT DOCUMENTS

| | | | |
|---|---|---|---|
| 2004/0097370 A1 | 5/2004 | Ichikawa et al. | |
| 2007/0092691 A1 | 4/2007 | Fujita | |
| 2009/0011178 A1 | 1/2009 | Masukawa et al. | |
| 2012/0317945 A1 | 12/2012 | Miyairi | |
| 2013/0055694 A1* | 3/2013 | Salmona | B01D 46/2429 428/116 |
| 2020/0384453 A1 | 12/2020 | Sasaki | |
| 2020/0386134 A1 | 12/2020 | Miyairi et al. | |

FOREIGN PATENT DOCUMENTS

| | | |
|---|---|---|
| EP | 1 666 435 A1 | 6/2006 |
| JP | 2002-253916 A1 | 9/2002 |
| JP | 2003-117322 A1 | 4/2003 |
| JP | 2003-155908 A1 | 5/2003 |
| JP | 2013-000680 A1 | 1/2013 |
| WO | WO 90/12646 A1 * | 4/1990 |
| WO | 2007/119407 A1 | 10/2007 |

\* cited by examiner

HONEYCOMB STRUCTURE

FIELD OF THE INVENTION

The present invention relates to a honeycomb structure.

BACKGROUND OF THE INVENTION

A large amount of particulate matters such as soot (also referred to as "PMs") are contained in exhaust gases discharged from internal combustion engines such as diesel engines and gasoline engines, and various combustion devices. When the PMs are directly discharged into the atmosphere, environmental pollution is caused. Therefore, an exhaust system for an exhaust gas is equipped with a dust collecting filter (also referred to as "particulate filter") for collecting the PMs. Examples of the dust collecting filter include diesel particulate filters (DPFs) and gasoline particulate filters (GPFs), which are used for purifying exhaust gases discharged from diesel engines and gasoline engines, and the like. In such DPFs and GPFs, a honeycomb structure is used that includes partition walls defining a plurality of cells penetrating and extending from a first end face to a second end face to form flow paths for a fluid.

Further, as the honeycomb structure used for the dust collecting filter is used, the particulate matters are deposited on an inner side of the honeycomb structure. This results in an increased pressure loss of the honeycomb structure, so that a collecting function as a dust collection filter will not be sufficiently obtained. Therefore, to regenerate the collecting capacity as a dust collecting filter, a regeneration process is carried out for burning and removing the particulate matters deposited on an inner side of the honeycomb structure on a regular basis. The regeneration process may generate thermal stress in the honeycomb structure due to the heat of combustion of the particulate matters, which may damage the honeycomb structure.

Therefore, as a measure for suppressing the damage to the honeycomb structure, Patent Literature 1 proposes a honeycomb structure having joining layers which join side surfaces of a plurality of pillar shaped honeycomb segments to each other.

Further, in recent years, a honeycomb structure having partition walls with lower thickness is often used for the dust collecting filter in order to suppress an increase in pressure loss. Patent Literature 2 proposes a honeycomb structure including partition walls having a lower thickness and a controlled average pore diameter in order to increase a collection efficiency of particulate matters in an exhaust gas while suppressing an increase in pressure loss.

CITATION LIST

Patent Literatures

[Patent Literature 1] Japanese Patent Application Publication No. 2002-253916 A
[Patent Literature 2] Japanese Patent Application Publication No. 2013-000680 A

SUMMARY OF THE INVENTION

The present invention relates to a honeycomb structure, comprising:
a plurality of pillar shaped honeycomb segments, each of the pillar shaped honeycomb segments comprising: a partition wall for defining a plurality of cells extending from a first end face to a second end face to form flow paths for a fluid; and a plugged portion that plugs predetermined opening end portions of the cells on the first end face side and remaining opening end portions of the cells on the second end face side; and
a joining layer arranged so as to join side surfaces of the pillar shaped honeycomb segments to each other,
wherein the partition wall contains silicon and silicon carbide and has an average thickness of from 0.152 to 0.254 mm; and
wherein the honeycomb structure satisfies the following equations (1) to (3):

$$y \leq 1000 \tag{1};$$

$$y \leq 717.92x^{-0.095} \tag{2); and}$$

$$y \geq 462.4x^{-0.153} \tag{3},$$

in which y is a maximum temperature (° C.) at which the use of the honeycomb structure is accepted, and x is a thermal conduction factor represented by the following equation:

thermal conduction factor=(thermal conductivity of the partition wall×thermal conductivity of the joining layer)/(average thickness of the joining layer×porosity of the partition wall).

DETAILED DESCRIPTION OF THE INVENTION

For the honeycomb structure having the joining layers which join the side surfaces of the plurality of pillar shaped honeycomb segments to each other, it is also considered that the thickness of the partition walls of the pillar shaped honeycomb segments are decreased.

However, the decreased thickness of the partition walls of the pillar shaped honeycomb segments will tend to generate cracks during the regeneration process. In particular, the particulate matters deposited on the inner side of the honeycomb structure may rapidly burn out, and the lower thickness of the partition walls of the pillar shaped honeycomb segments may tend to generate cracks in the honeycomb structure due to sudden changes of temperature. For example, in a DTI (Drop To Idle) test for evaluating abnormal combustion of the particulate matters, the particulate matters deposited on the inner side of the honeycomb structure rapidly burns out in an idling state to increase a temperature of the honeycomb structure significantly, so that the temperature change tends to generate cracks in the honeycomb structure.

The present invention has been made to solve the above problems. An object of the present invention is to provide a honeycomb structure that can suppress cracking during a regeneration process even if the thickness of the partition walls of the pillar shaped honeycomb segment is decreased.

As a result of intensive studies for a honeycomb structure having joining layers that have joined side surfaces of a plurality of pillar shaped honeycomb segments having partition walls with lower thickness to each other, the present inventors have found that the above problems can be solved by controlling a relationship between a maximum temperature at which the use of a honeycomb structure is accepted, and a thermal conduction factor represented by thermal conductivity and porosity of partition walls forming pillar shaped honeycomb segments, as well as an average thickness of the joining layers that join side surfaces of the pillar shaped honeycomb segments, and they have completed the present invention.

According to the present invention, it is possible to provide a honeycomb structure that can suppress cracking during a regeneration process even if the thickness of the partition walls of the pillar shaped honeycomb segments is decreased.

Hereinafter, embodiments according to the present invention will be specifically described with reference to the drawings. It is to understand that the present invention is not limited to the following embodiments, and various modifications and improvements, which will be within the scope of the present invention, may be made based on ordinary knowledge of a person skilled in the art, without departing from the spirit of the present invention.

Figure 1:
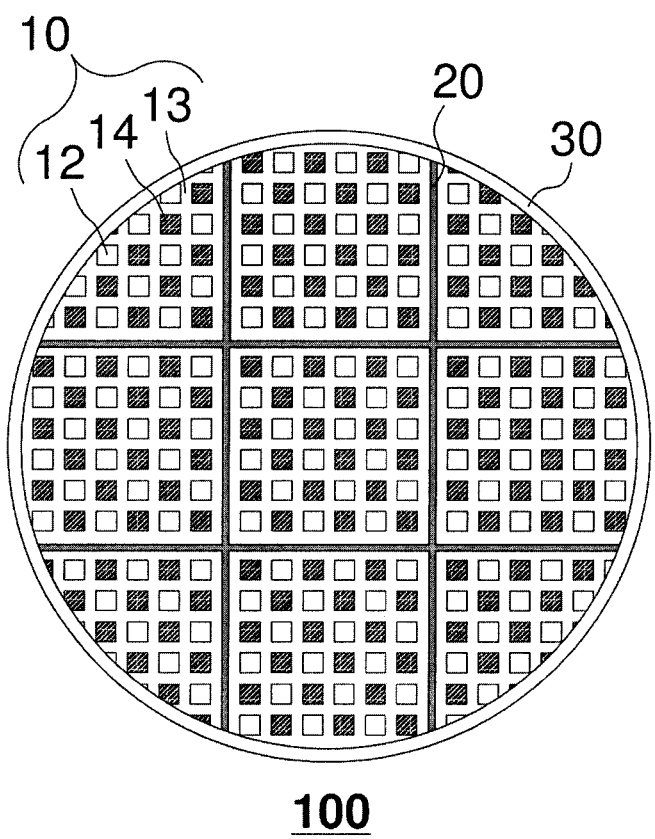
FIG. 1 is an end view of a honeycomb structure according to an embodiment of the present invention.

FIG. 1 is an end view of a honeycomb structure according to an embodiment of the present invention. Further, FIG. 2 is a cross-sectional view of a pillar shaped honeycomb segment forming the honeycomb structure in FIG. 1, which is parallel to a cell extending direction.

As shown in FIG. 1, a honeycomb structure 100 includes: a plurality of pillar shaped honeycomb segments 10; and joining layers 20 arranged so as to join side surfaces of the pillar shaped honeycomb segments 10 to each other. Further, the honeycomb structure 100 may be optionally processed into a predetermined shape such as a cylindrical shape by grinding an outer peripheral portion or the like. In this case, partition walls 13 and cells 12 inside the pillar shaped honeycomb segment 10 are in an exposed state by the processing, so that an outer peripheral coated layer 30 can be provided by covering the exposed surface with a coating material or the like.

The honeycomb structure 100 has any shape, including, but not limited to, a cylindrical shape, a pillar shape having an elliptical end face, and a polygonal pillar shape having a square, rectangular, triangular, pentagonal, or hexagonal end face, or the like.

Figure 2:
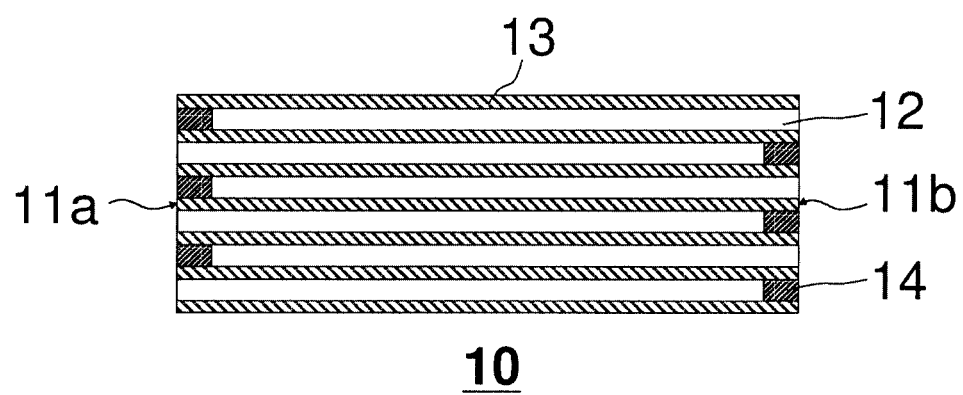
FIG. 2 is a cross-sectional view of a pillar shaped honeycomb segment forming the honeycomb structure in FIG. 1, which is parallel to a cell extending direction.

As shown in FIG. 2, the pillar shaped honeycomb segment 10 includes:
partition walls 13 for defining a plurality of cells 12 extending from a first end face 11a to a second end face 11b to form flow paths for a fluid; plugged portions 14 that plug predetermined open end portions of the cells 12 on the end surface 11a side and remaining open end portions of the cells 12 on the second end surface 11b side.

Each partition wall 13 contains silicon and silicon carbide. The use of the partition walls 13 containing such components can lead to improvement of heat resistance and thermal conductivity, so that cracking due to thermal stress can be suppressed.

In addition to the above components, the partition walls 13 may contain known components such as cordierite, mullite, alumina, titania, spinel, silicon carbide-cordierite composite materials, lithium aluminum silicate, aluminum titanate, and iron-chromium-aluminum alloys.

The partition walls 13 have an average thickness of from 0.152 to 0.254 mm. The average thickness of 0.152 mm or more can ensure strength as a dust collecting filter. The average thickness of 0.254 mm or less can suppress an increase in pressure loss.

The honeycomb structure 100 satisfies the following equations (1) to (3):

$$y \leq 1000 \quad (1);$$

$$y \leq 717.92 x^{-0.095} \quad (2); \text{ and}$$

$$y \geq 462.4 x^{-0.153} \quad (3),$$

in which y is a maximum temperature (° C.) at which the use of the honeycomb structure 100 is accepted, and x is a thermal conduction factor represented by the following equation:

thermal conduction factor=(thermal conductivity of partition walls 13×thermal conductivity of joining layers 20)/(average thickness of joining layers 20×porosity of partition walls 13).

The above equations (1) to (3) are relational expressions experimentally derived from results obtained by investigating the presence or absence of cracking (specifically, ring cracking or end face cracking) during a regeneration process of prepared various samples of the honeycomb structure 100, and a combustion rate of soot immediately before the idling state. The ring cracking refers to ring-shaped cracks formed on an outer periphery of the honeycomb structure 100 so as to extend in the outer peripheral direction. Further, the end face cracking refers to cracks formed on the partition walls 13 on the end face of the honeycomb structure 100.

Here, the above investigated results will be described.

First, various samples of the honeycomb structure 100 were prepared as follows:
(Preparation of Pillar Shaped Honeycomb Segment 10)

As raw materials, silicon carbide powder and metallic silicon powder were mixed at a mass ratio of 20:35, to which a pore former (in an amount of 10% by mass or less based on the total mass of silicon carbide powder and metallic silicon powder) and a binder (in an amount of from 2 to 10% by mass based on the total mass of the silicon carbide powder and the metallic silicon powder), a surfactant and water were added, mixed and kneaded to obtain a green body. The obtained green body was then extruded and cut, and dried with microwaves and hot air to obtain pillar shaped honeycomb formed bodies. For the pillar shaped honeycomb formed body, an opening end portion on one end face of two end faces of one cell 12 was then plugged such that one end face (first end face 11a) and the other end face (second end face 11b) presents a complementary checkered pattern. A plugging slurry employed the same materials as the raw material of the pillar shaped honeycomb formed body. The opening end portions were filled with the plugging slurry and dried, and the plugged pillar shaped honeycomb formed bodies were then degreased in the atmosphere at 200 to 600° C., and then fired in an Ar inert atmosphere at 1420 to 1480° C. to obtain pillar shaped honeycomb segments 10. An average thickness of the partition walls 13 of each pillar shaped honeycomb segments 10 was controlled by adjusting a slit width of a die during extrusion molding. Further, the porosity of the partition walls 13 was controlled by adjusting the amount of the pore former. The porosity of the partition walls 13 was measured using a mercury porosimeter (the trade name: Autopore 9500 from Micromeritics). The thermal conductivity of the partition walls 13 was controlled by adjusting the porosity and/or by performing an oxidation treatment on the fired pillar shaped honeycomb segments 10. The oxidation treatment can be carried out by a conventionally known method. More particularly, the fired pillar shaped honeycomb segments 10 can be subjected to the oxidation treatment by heating them in an oxygen atmosphere (for example, an oxygen concentration of 15 to 20% by mass) at 900 to 1400° C.

(Preparation of Joining Material)

A joining material is for forming the joining layers 20, and the curing of the joining material will form the joining layers 20. The joining material in the form of paste was prepared by formulating and mixing the same raw materials as those of the pillar shaped honeycomb segment 10. The thermal conductivity of the joining layers 20 was controlled by adjusting the porosity. The porosity was controlled by adjusting the amount of the pore former, as with the pillar shaped honeycomb segments 10.

(Production of Honeycomb Structure 100)

The joining material was applied to side surfaces of the pillar shaped honeycomb segments 10 such that the applied joining material has a predetermined average thickness, and joined to side surfaces of the other pillar shaped honeycomb segments 10. This step was repeated to produce a stacked body consisting of the total 9 pillar shaped honeycomb segments 10 in which 3 pillar shaped honeycomb segments in the vertical direction and 3 pillar shaped honeycomb segments 10 in the horizontal direction were joined. The pillar shaped honeycomb segments 10 were then pressed against one another by applying pressure from the outside, and dried at 120° C. for 2 hours to obtain a joined body of the pillar shaped honeycomb segments 10. An outer circumference of the joined body was cut such that a cross section in a direction perpendicular to a central axis of the resulting joined body was circular. An outer peripheral coating material having the same composition as that of the joining material was applied to the processed surface, and then dried and cured by heating it at 600° C. for 0.5 hours or more to form an outer peripheral coated layer 30, thereby obtaining honeycomb structures 100 of Sample Nos. A-1 to A-9, B-1 to B-9 and C-1 to C-9.

The presence or absence of cracking was then investigated as follows:

A non-expandable mat made of ceramics was wrapped around an outer peripheral portion of each honeycomb structure 100 produced above, and a can body made of stainless steel (SUS409) was canned to form a canning structure. A combustion gas containing soot (particulate matters) generated by combustion of a diesel fuel (light oil) was allowed to flow from one end face of the honeycomb structure 100 and to flow out from the other end face. As a result, the soot was deposited in the honeycomb structure 100. The canning structure was then connected to an exhaust system, and a DTI (Drop To Idle) test was conducted. More particularly, once a temperature of the honeycomb structure 100 is increased with the heat of the exhaust gas in a full throttle state (2300 rpm) and the temperature then reaches 650° C., the full throttle state is allowed to transfer to an idling state (600 rpm) rapidly to burn out the soot, thereby subjecting the honeycomb structure 100 to a regenerate process. An oxygen concentration of the exhaust gas in the full throttle state was 6%, and the oxygen concentration in the idling state was 15%.

In the above DTI test, the temperature of the honeycomb structure 100 in the idling state was measured, and the maximum value of the measured temperature was determined to be the maximum temperature. This is because the soot accumulated in the honeycomb structure 100 is rapidly burned out in the idling state to increase the temperature of the honeycomb structure 100 remarkably.

Further, after the DTI test, the presence or absence of cracks in the honeycomb structure 100 was investigated by X-ray CT.

Furthermore, the soot combustion was evaluated immediately before the idling state (full throttle state). More particularly, a combustion rate of soot immediately before the idling state was calculated from a soot combustion model based on the measured temperature data.

Figure 3:
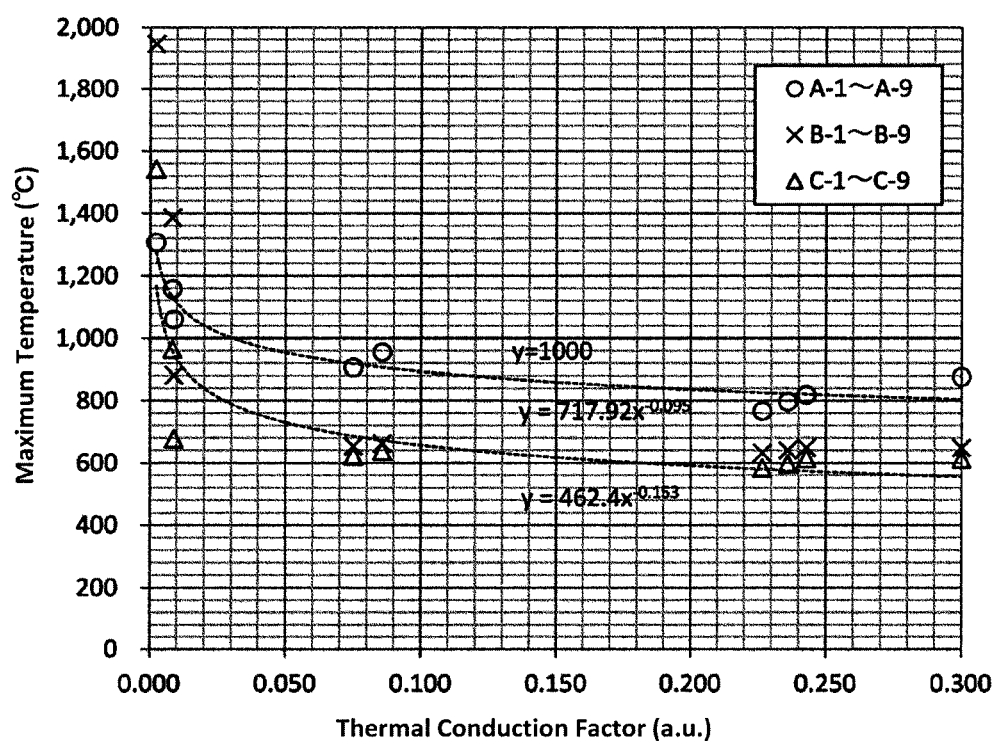
FIG. 3 is a graph showing a relationship between a thermal conduction factor and a maximum temperature of a honeycomb structure.

The above results are shown in Table 1. Further, FIG. 3 shows a graph showing a relationship between a thermal conduction factor x calculated from the thermal conductivity and porosity of the partition walls 13 as well as the thermal conductivity and average thickness of the joining layers 20, and the maximum temperature of the honeycomb structure 100. It should be noted that in Table 1, those in which no cracks were found are indicated by "○", and those in which cracks were found are indicated by "x".

TABLE 1

| No. | Honeycomb Structure Diameter × Length (mm) | Cell Density (cells/cm²) | Partition Wall Average Thickness (mm) | Thermal Conductivity (W/m · K) | Porosity (%) | Joining Layer Average Thickness (mm) | Thermal Conductivity (W/m · K) | Thermal Conduction Factor (a.u.) | Maximum Temperature (° C.) | Presence or Absence of Cracks | Evaluation of Soot Combustion Combustion Rate (%) | Results | Categories |
|---|---|---|---|---|---|---|---|---|---|---|---|---|---|
| A-1 | 143.8 × 152.4 | 48 | 0.1524 | 34.0 | 30 | 0.5 | 0.1 | 0.227 | 766.8 | ○ | 11.0 | ○ | Example |
| A-2 | 143.8 × 152.4 | 48 | 0.1524 | 18.0 | 48 | 0.5 | 0.1 | 0.075 | 906.8 | ○ | 14.2 | ○ | Example |
| A-3 | 143 8 × 152.4 | 48 | 0.1524 | 0.8 | 70 | 0.5 | 0.1 | 0.002 | 1308.0 | x | 20.9 | x | Comp |
| A-4 | 143.8 × 152.4 | 48 | 0.1524 | 18.0 | 30 | 1.0 | 0.5 | 0.300 | 876.4 | x | 16.0 | x | Comp. |
| A-5 | 143 8 × 152.4 | 48 | 0.1524 | 0.8 | 48 | 1.0 | 0.5 | 0.008 | 1157.3 | x | 18.1 | x | Comp. |
| A-6 | 143 8 × 152.4 | 48 | 0.1524 | 34.0 | 70 | 1.0 | 0.5 | 0.243 | 819.2 | ○ | 15.3 | ○ | Example |
| A-7 | 143 8 × 152.4 | 48 | 0.1524 | 0.8 | 30 | 3.0 | 1.0 | 0.009 | 1060.9 | x | 14.8 | ○ | Comp. |
| A-8 | 143 8 × 152.4 | 48 | 0.1524 | 34.0 | 48 | 3.0 | 1.0 | 0.236 | 797.0 | ○ | 13.2 | ○ | Example |
| A-9 | 143 8 × 152.4 | 48 | 0.1524 | 18.0 | 70 | 3.0 | 1.0 | 0.086 | 955.4 | x | 17.2 | x | Comp. |
| B-1 | 304.8 × 304.8 | 48 | 0.1524 | 34.0 | 30 | 0.5 | 0.1 | 0.227 | 632.4 | ○ | 0.30 | ○ | Example |
| B-2 | 304 8 × 304.8 | 48 | 0.1524 | 18.0 | 48 | 0.5 | 0.1 | 0.075 | 653.3 | x | 0.60 | ○ | Comp. |
| B-3 | 304.8 × 304.8 | 48 | 0.1524 | 0.8 | 70 | 0.5 | 0.1 | 0.002 | 1945.6 | x | 1.90 | x | Comp. |
| B-4 | 304.8 × 304.8 | 48 | 0.1524 | 18.0 | 30 | 1.0 | 0.5 | 0.300 | 648.6 | ○ | 0.40 | ○ | Example |
| B-5 | 304.8 × 304.8 | 48 | 0.1524 | 0.8 | 48 | 1.0 | 0.5 | 0.008 | 1386.6 | x | 1.20 | x | Comp. |
| B-6 | 304.8 × 304.8 | 48 | 0.1524 | 34.0 | 70 | 1.0 | 0.5 | 0.243 | 649.1 | ○ | 0.50 | ○ | Example |

TABLE 1-continued

| | Honeycomb Structure | | Partition Wall | | | Joining Layer | | Thermal Con-duction Factor (a.u.) | Max-imum Temp-erature (° C.) | Presence or Absence of Cracks | Evaluation of Soot Combustion | | |
|---|---|---|---|---|---|---|---|---|---|---|---|---|---|
| No. | Diameter × Length (mm) | Cell Density (cells/cm²) | Average Thickness (mm) | Thermal Conductivity (W/m·K) | Poro-sity (%) | Average Thick-ness (mm) | Thermal Con-ductivity (W/m·K) | | | | Combustion Rate (%) | Re-sults | Cate-gories |
| B-7 | 304.8 × 304.8 | 48 | 0.1524 | 0.8 | 30 | 3.0 | 1.0 | 0.009 | 881.9 | x | 0.80 | ○ | Comp. |
| B-8 | 304.8 × 304.8 | 48 | 0.1524 | 34.0 | 48 | 3.0 | 1.0 | 0.236 | 641.2 | ○ | 0 38 | ○ | Example |
| B-9 | 304 8 × 304.8 | 48 | 0.1524 | 18.0 | 70 | 3.0 | 1 0 | 0.086 | 662.7 | x | 0 88 | x | Comp |
| C-1 | 304.8 × 304.8 | 48 | 0.2540 | 34 0 | 30 | 0.5 | 0.1 | 0.227 | 583.3 | ○ | 0 05 | ○ | Example |
| C-2 | 304.8 × 304.8 | 48 | 0 2540 | 18.0 | 48 | 0.5 | 0.1 | 0.075 | 622.5 | x | 0.15 | ○ | Comp. |
| C-3 | 304.8 × 304.8 | 48 | 0.2540 | 0.8 | 70 | 0.5 | 0.1 | 0.002 | 1542.1 | x | 0.94 | x | Comp. |
| C-4 | 304.8 × 304.8 | 48 | 0.2540 | 18.0 | 30 | 1.0 | 0.5 | 0.300 | 612.3 | ○ | 0.10 | ○ | Example |
| C-5 | 304.8 × 304.8 | 48 | 0.2540 | 0.8 | 48 | 1.0 | 0.5 | 0.008 | 965.0 | ○ | 0.51 | ○ | Example |
| C-6 | 304.8 × 304.8 | 48 | 0.2540 | 34.0 | 70 | 1.0 | 0.5 | 0.243 | 614.0 | ○ | 0.18 | ○ | Example |
| C-7 | 304 8 × 304.8 | 48 | 0.2540 | 0.8 | 30 | 3.0 | 1.0 | 0.009 | 677.5 | x | 0.35 | ○ | Comp. |
| C-8 | 304 8 × 304.8 | 48 | 0.2540 | 34.0 | 48 | 3.0 | 1.0 | 0.236 | 597.9 | ○ | 0.09 | ○ | Example |
| C-9 | 304 8 × 304.8 | 48 | 0.2540 | 18.0 | 70 | 3.0 | 1.0 | 0.086 | 637.8 | x | 0.32 | ○ | Comp. |

As shown in Table 1 and FIG. 3, the honeycomb structures 100 (Examples) in the ranges represented by the above equations (1) to (3) did not generate cracks in the regeneration process. However, the honeycomb structures 100 (Comparative Examples) beyond the ranges represented by the above equations (1) to (3) generated cracks in the regeneration process.

For the evaluation of soot combustion, the honeycomb structures 100 in which cracks were generated (Comparative Examples) had a higher combustion rate of soot immediately before the idling state (full throttle state). In the DTI test, the soot burns out even in the full throttle state immediately before the idling state, but when a large amount of soot burns out in the full throttle state, the honeycomb structure 100 is heated by the combustion heat. The heated honeycomb structure 100 is further heated by the combustion heat of soot in the idling state. Therefore, it is believed that the maximum temperature of the honeycomb structure 100 is increased, and as a result, the cracks tend to be generated. The evaluation criteria for the combustion rate of soot immediately before the idling state are different depending on conditions of a diameter and length of the honeycomb structure 100 and the average thickness of the partition walls 13 of the pillar shaped honeycomb segments 10. If in the sample Nos. A-1 to A-9 to which these conditions are common, the combustion rate of soot is 15.7% or less, in the sample Nos. B-1 to B-9, the combustion rate of is 0.83% or less, and in the sample Nos. C-1 to C-9, the combustion rate of soot is 0.54% or less, it can be said that the combustion rate of soot immediately before the idling state is low (the evaluation result is expressed as "○"). By decreasing the combustion rate of soot immediately before the idling state, the heating temperature of the honeycomb structure 100 will be decreased, so that the heating temperature (maximum temperature) of the honeycomb structure 100 in the idling state can be reduced. For example, based on the comparison of the sample Nos. A-1, A-2, A-6 and A-8 having the lower combustion rate of soot immediately before the idling state (the result of the soot combustion evaluation is "○") with the sample Nos. A-4 and A-9 having the higher combustion rate of soot immediately before the idling state (the result of the soot burning evaluation is "x"), the satisfaction of the equation (2): $y \leq 717.92 x^{-0.095}$ can allow the combustion rate of soot immediately before the idling state to be lowered to suppress the generation of the cracks.

In the sample Nos. A-7, B-2, B-7, C-2, C-7 and C-9, the cracks are generated even if the combustion rate of soot immediately before the idling state is lower. The reason for this fact will be described below.

Figure 4:
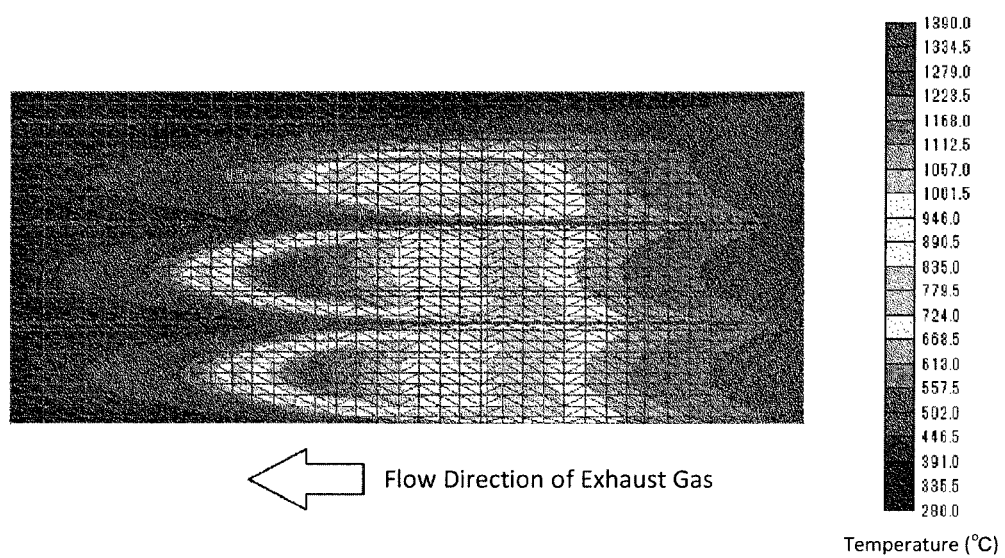
FIG. 4 is a temperature distribution map of a honeycomb structure of sample No. B-5 in an idling state.

The sample No. A-7 has a higher temperature (maximum temperature) in the idling state (higher than 1000° C.). Here, FIG. 4 shows, as a reference, a temperature distribution map of the honeycomb structure 100 for the sample No. B-5 having a higher temperature of the honeycomb structure 100 in the idling state, as with the sample No. A-7. As with the sample No. A-7, the sample No. B-5 has a lower thermal conductivity of the partition walls 13, so that the heat gradually spreads to the whole while filling the interior of the honeycomb structure 100 with heat. Then, as shown in FIG. 4, the vicinity of the central portion in the length direction of the honeycomb structure 100 reaches the maximum temperature in the idling state. As a result, in the vicinity of the central portion in the length direction of the honeycomb structure 100, the tensile stress due to thermal expansion tends to occur so as to be orthogonal to the flow direction of the exhaust gas. Therefore, it is believed that ring cracks are generated. Accordingly, the generation of ring cracks can be suppressed by satisfying the equation (1) $y \leq 1000$.

Figure 5:
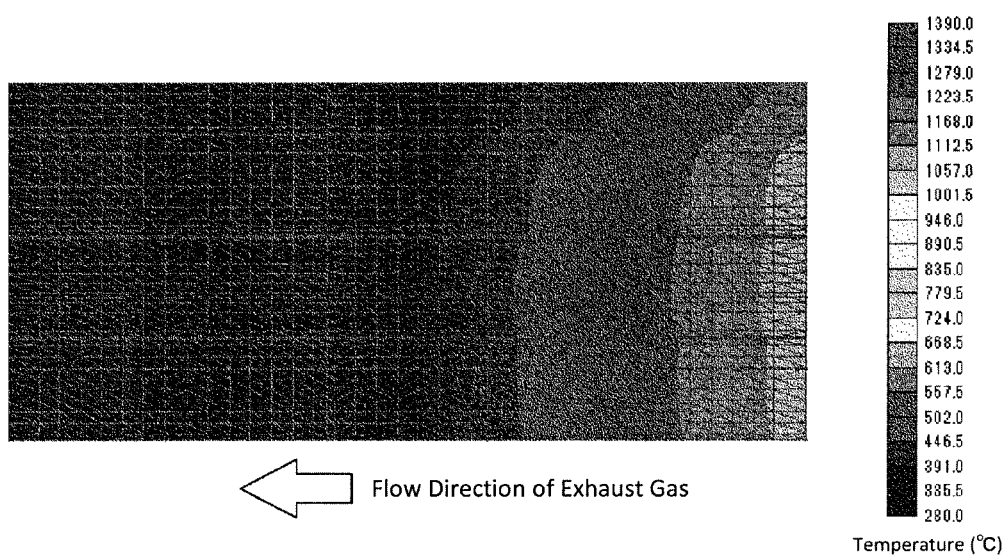
FIG. 5 is a temperature distribution map of a honeycomb structure of sample No. B-2 in an idling state.

On the other hand, the sample Nos. B-2, B-7, C-2, C-7 and C-9 has a lower temperature of the honeycomb structure 100 in the idling state. Here, FIG. 5 shows, as an example, a temperature distribution map of the honeycomb structure 100 for the sample No. B-2. The sample Nos. B-2, C-2, and C-9 have higher thermal conductivity of the partition walls 13, so that the heat instantaneously spreads in the vicinity of the end face of the honeycomb structure 100 at an exhaust gas inlet. Then, as shown in FIG. 5, the vicinity of the end surface of the honeycomb structure 100 at the exhaust gas inlet reaches the maximum temperature in the idling state. As a result, in the vicinity of the end face of the honeycomb structure 100 at the exhaust gas inlet, the tensile stress due to thermal expansion tends to occur in the length direction of the honeycomb structure 100. It is thus believed that end face cracks are generated. Further, the sample Nos. B-7 and C-7 has lower thermal conductivity of the partition walls 13, while having higher thermal conductivity of the joining layers 20, and they are in a state where a difference between temperatures of the partition walls 13 at the center and the outer periphery of the pillar shaped honeycomb segment 10 tends to be generated. As a result, it is believed that the tensile stress is generated due to the difference in thermal expansion between the central portion and the partition walls 13 on the outer peripheral portion of the pillar shaped honeycomb segment 10, thereby generating the end face cracks in the vicinity of the end face.

In addition, the sample Nos. B-1, B-4, B-6 and B-8 had gentler temperature distribution of the honeycomb structure 100 in the axial direction (length direction) than that of the sample No. B-2. Therefore, it is believed that the end face cracks were not generated because the tensile stress due to the axial thermal expansion of the honeycomb structure 100 was reduced in the vicinity of the end face at the exhaust gas inlet. Accordingly, the generation of end face cracks can be reduced by satisfying the equation (3) $y \geq 462.4x^{-0.153}$.

From the above results, the generation of cracks can be suppressed during the regeneration process of the honeycomb structure 100 by satisfying the above equations (1) to (3).

The honeycomb structure 100 preferably further satisfies the following equation (4):

$$x \leq 2.3 \quad (4).$$

The equation (4) is also an experimentally derived relational equation, similarly to the equations (1) to (3). By satisfying the equation (4), the generation of cracks can be stably suppressed during the regeneration process of the honeycomb structure 100. The thermal conduction factor x is more preferably 1.5 or less, and further preferably 1.0 or less, and particularly preferably 0.3 or less.

The thermal conductivity of the partition walls 13 may preferably be from 0.8 to 34 W/m·K, although not particularly limited thereto. The controlling of the thermal conductivity of the partition walls 13 in such a range can allow the generation of cracks to be stably suppressed during the regeneration process of the honeycomb structure 100. Examples of the method for controlling the thermal conductivity of the partition walls 13 in the above range include control of the porosity, control of the presence or absence of an oxidation treatment and a treatment time in the production of the honeycomb structure 100. When the porosity is increased or the oxidation treatment is performed, the thermal conductivity tends to decrease.

Here, the "thermal conductivity" as used herein means a thermal conductivity measured at room temperature (25° C.) using a laser flash method.

The porosity of the partition walls 13 may preferably be from 30 to 70%, although not particularly limited thereto. The controlling of the porosity of the partition walls 13 in such a range can allow the generation of cracks to be stably suppressed during the regeneration process of the honeycomb structure 100.

Here, the "porosity" as used herein means a porosity measured using a mercury porosity meter. Examples of the mercury porosimeter include a trade name: Autopore 9500 from Micromeritics.

The pillar shaped honeycomb segment 10 may have any cross-sectional shape perpendicular to an extending direction of the cells 12, including, but not limited to, various shapes such as a triangle, a quadrangle, a hexagon, and an octagon. Among them, the cross-sectional shape of the pillar shaped honeycomb segment 10 may preferably be the quadrangle (square or rectangle). The pillar shaped honeycomb segment 10 having such a shape can lead to easy production of the honeycomb structure 100.

Each cell 12 may have any cross-sectional shape perpendicular to the extending direction of the cells 12, including, but not limited to, various shapes such as a triangle, a quadrangle, a hexagon, an octagon, and a circle. Among them, the cross-sectional shape of each cell 12 may preferably be the quadrangle (square or rectangle).

Further, in the cells 12, the first cells each having a predetermined opening area and second cells each having a different opening area from that of each first cell may be alternately arranged.

The pillar shaped honeycomb segment 10 may have any cell density, including, but not particularly limited to, preferably from 23 to 62 cells/cm², and more preferably from 31 to 52 cells/cm². The cell density of 23 cells/cm² or more can allow the strength as a dust collecting filter to be ensured. Further, the cell density of 62 cells/cm² or less can allow an increase in pressure loss to be suppressed.

The pillar shaped honeycomb segment 10 can be produced according to a method known in the art. More particularly, it is produced as follows: First, a binder, a dispersant (surfactant), a pore former, water, and the like are added to a ceramic raw material containing silicon and silicon carbide, and mixed and kneaded together to obtain a green body. The green body is then extruded into a predetermined honeycomb shape, cut to a desired length, and then dried by microwaves, hot air, or the like. For the pillar shaped honeycomb formed bodies thus obtained, an open end portion of one of two end faces of one cell 12 is plugged. In general, adjacent cells 12 are alternately plugged such that one end face (first end face 11a) and the other end face (second end face 11b) present a complementary checkered pattern. As a plugging method, a method known in the art can be used. More particularly, sheets are attached to the end faces of the pillar shaped honeycomb molded body, and holes are then created at positions in the sheets, which correspond to the cells 12 to be plugged. In a state where the sheets are attached, the end faces of the pillar shaped honeycomb formed body may be immersed in a plugging slurry which is a slurry of the plugging material, thereby filling the open end portions of the cells to be plugged with the plugging slurry, which may be dried and/or fired to cure it. As the plugging material, a material having the same components as those of the material used for the pillar shaped honeycomb formed body is used in order to reduce a difference in thermal expansion between the partition wall 13 and the plugged portion 14. The plugged pillar shaped honeycomb structure may be then fired to provide a pillar shaped honeycomb segment 10. It should be noted that the pillar shaped honeycomb formed body may be fired before the cells 12 are plugged. Further, after firing, grinding or the like may be optionally performed to obtain a predetermined shape.

Non-limiting examples of the binder include inorganic binders such as colloidal silica (silica sol), alumina sol, and clays such as bentonite and montmorillonite; and organic binders such as methyl cellulose, carboxymethyl cellulose, hydroxypropoxyl cellulose, hydroxyethyl cellulose, polyvinyl alcohol (PVA), polyvinyl butyral (PVB) or various water-absorbing resins. These can be used alone or in combination of two or more.

Non-limiting examples of the dispersant (surfactant) that can be used include PEG oleate, ethylene glycol, dextrin, fatty acid soaps, polyalcohol and the like. These can be used alone or in combination of two or more.

The pore former is not particularly limited as long as it forms pores after firing, and it includes starch, foaming resins, water absorbent resins, silica gel, carbon and the like. These can be used alone or in combination of two or more.

The joining layers 20 that join the side surfaces of the pillar shaped honeycomb segments 10 are not particularly limited, and they may contain components such as inorganic powder, inorganic fibers, pore formers, binders, and dispersants. Among them, the components used for the joining layers 20 are preferably the same as those used for the pillar shaped honeycomb segment 10. Such a configuration can allow a difference in thermal expansion between the pillar shaped honeycomb segment 10 and the joining layer 20 to be reduced, so that the generation of cracks can be stably suppressed during the regeneration process of the honeycomb structure 100.

In addition, the joining layers 20 are formed by using a paste joining material containing the above components.

The joining layers 20 may have any average thickness, including, but not particularly limited to, preferably from 0.5 to 3.0 mm. The controlling of the average thickness of the joining layers 20 in such a range can allow the generation of cracks to be stably suppressed during the regeneration process of the honeycomb structure 100.

The joining layers 20 may have any thermal conductivity, including, but not particularly limited to, preferably from 0.1 to 1.0 W/m·K. The controlling of the thermal conductivity of the joining layers 20 in such a range can allow the generation of cracks to be stably suppressed during the regeneration process of the honeycomb structure 100. Examples of the method for controlling the thermal conductivity of the joining layers 20 in the above range include control of the porosity, and the like. An increased porosity tends to reduce the thermal conductivity.

The honeycomb structure 100 is produced using the pillar shaped honeycomb segments 10 and the joining material as described above. The production method is not particularly limited, and it can be performed by a method known in the art. More particularly, the joining material can be applied to the side surfaces of the pillar shaped honeycomb segments 10 to join the side surfaces of the pillar shaped honeycomb segments 10 and then dried to cure the joining material to form the joining layers 20. The drying conditions are not particularly limited, and they may be optionally adjusted depending on the composition of the joining material. Further, the drying may be performed while pressure-bonding the pillar shaped honeycomb segments 10 to each other by applying a pressure from the outside.

The honeycomb structure 100 can be used as a dust collecting filter such as DPFs, GPFs and the like. In this case, in the honeycomb structure 100, an exhaust gas containing particulate matters flows into the inside from the cells 12 on one end surface to which the plugged portions 14 are not provided, passes through the partition walls 13, and enters the other cells 12. At this time, the particulate matters in the exhaust gas are captured by the partition walls 13. The exhaust gas having the particulate matters to be captured is then discharged from the cells 12 on the other end surface to which the plugged portions 14 are not provided.

The honeycomb structure 100 may support a catalyst on the surfaces of the partition walls 13 or in the pores. The catalyst is not particularly limited, and it can be selected according to applications of the honeycomb structure 100. For example, when the honeycomb structure 100 is used as the DPF, oxidation catalysts for oxidizing and removing soot and the like in an exhaust gas, and NOx selective catalytic reduction (SCR) catalysts for decomposing and removing harmful substances such as NOx contained in the exhaust gas, NOx storage reduction catalysts, and the like can be used. The method for supporting the catalyst is not particularly limited, and a method known in the art can be used.

The honeycomb structure 100 according to the embodiment of the present invention having the above features can suppress the generation of cracks during the regeneration process even if the thickness of each partition wall 13 of the pillar shaped honeycomb segment 10 is decreased.

DESCRIPTION OF REFERENCE NUMERALS

10 pillar shaped honeycomb segment
11a first end face
11b second end face
12 cell
13 partition wall
14 plugged portion
20 joining layer
30 outer peripheral coated layer
100 honeycomb structure

The invention claimed is:

1. A honeycomb structure, comprising:
   a plurality of pillar shaped honeycomb segments, each of the pillar shaped honeycomb segments comprising: a partition wall for defining a plurality of cells extending from a first end face to a second end face to form flow paths for a fluid; and a plugged portion that plugs predetermined opening end portions of the cells on the first end face side and opening end portions of the cells that remain open on the second end face side; and
   a joining layer arranged so as to join side surfaces of the pillar shaped honeycomb segments to each other,
   wherein the partition wall contains silicon and silicon carbide and has an average thickness of from 0.152 to 0.254 mm; and
   wherein the honeycomb structure satisfies the following equations (1) to (3):

$$y \leq 1000 \tag{1};$$

$$y \leq 717.92 x^{-0.095} \tag{2); and}$$

$$y \geq 462.4 x^{-0.153} \tag{3},$$

in which y is a maximum temperature (° C.) of the honeycomb structure during a regeneration process to burn off particulate matter in an idling state, and x is a thermal conduction factor,
   wherein the regeneration process comprises flowing a combustion gas containing particulate matter generated by combustion of a diesel fuel through the honeycomb structure to deposit the particulate matter therein, increasing a temperature of the honeycomb structure of 650° C. with heat of exhaust gas having an oxygen concentration of 6% at a full throttle state of 2300 rpm, in and then subjecting the honeycomb structure to the regeneration process by transferring the full throttle state to an idling state of 650 rpm with exhaust gas having an oxygen concentration of 15% and measuring the maximum temperature reached by the honeycomb structure while burning off the particulate matter, and wherein thermal conduction factor=(thermal conductivity (W/m·K) of the partition wall×thermal conductivity (W/m·K) of the joining layer)/(average thickness (mm) of the joining layer×porosity (%) of the partition wall).

2. The honeycomb structure according to claim 1, wherein the partition wall has a thermal conductivity of from 0.8 to 34 W/m·K.

3. The honeycomb structure according to claim 1, wherein the joining layer has a thermal conductivity of from 0.1 to 1.0 W/m·K.

4. The honeycomb structure according to claim 1, wherein the joining layer has an average thickness of from 0.5 to 3.0 mm.

5. The honeycomb structure according to claim 1, wherein the partition wall has a porosity of from 30 to 70%.

6. The honeycomb structure according to claim 1, wherein the honeycomb structure further satisfies the following equation (4):

$$x \leq 2.3 \tag{4}$$

7. The honeycomb structure according to claim 1, wherein each of the cells has a quadrangular cross-sectional shape perpendicular to an extending direction of the cells.

8. The honeycomb structure according to claim 1, wherein the cells are formed such that first cells having a predetermined opening area and second cells having an opening area different from that of the first cells are alternately arranged.

9. The honeycomb structure according to claim 1, wherein the honeycomb structure has a cell density of from 31 to 52 cells/cm$^2$.

* * * * *